US008443965B2

(12) United States Patent
Matsuda (10) Patent No.: US 8,443,965 B2
(45) Date of Patent: May 21, 2013

(54) TAKE-UP MACHINE

(75) Inventor: Koji Matsuda, Toyama (JP)

(73) Assignee: YKK Corporation (JP)

( * ) Notice: Subject to any disclaimer, the term of this patent is extended or adjusted under 35 U.S.C. 154(b) by 138 days.

(21) Appl. No.: 13/078,033

(22) Filed: Apr. 1, 2011

(65) Prior Publication Data

US 2011/0247917 A1    Oct. 13, 2011

(30) Foreign Application Priority Data

Apr. 7, 2010   (JP) .................................. 2010-088406

(51) Int. Cl.
*B29C 47/30*   (2006.01)

(52) U.S. Cl.
USPC .................... 198/626.3; 226/174; 226/192

(58) Field of Classification Search
USPC ........... 198/586, 604, 608, 620, 626.1, 626.2, 198/626.3, 861.1; 226/171, 172, 173, 174, 226/176, 192
See application file for complete search history.

(56) References Cited

U.S. PATENT DOCUMENTS

| 3,620,432 | A | | 11/1971 | Emery | |
|---|---|---|---|---|---|
| 3,881,647 | A | * | 5/1975 | Wolfe | 226/172 |
| 4,039,109 | A | * | 8/1977 | Rhodes | 226/172 |
| 4,726,501 | A | * | 2/1988 | Wiley | 226/15 |
| 4,759,485 | A | * | 7/1988 | Braun et al. | 226/176 |
| 4,817,845 | A | * | 4/1989 | Franchuk | 226/172 |
| 4,872,824 | A | * | 10/1989 | Williams et al. | 425/113 |
| 5,435,433 | A | * | 7/1995 | Jordan et al. | 198/626.5 |
| 5,806,745 | A | * | 9/1998 | Irwin | 226/74 |
| 5,901,832 | A | * | 5/1999 | Woolley et al. | 198/626.3 |
| 7,255,222 | B2 | * | 8/2007 | Yoshida | 198/626.1 |
| 7,571,589 | B2 | * | 8/2009 | Shaw et al. | 53/403 |
| 7,624,978 | B2 | * | 12/2009 | Kaiping | 271/35 |
| 7,810,631 | B2 | * | 10/2010 | Kawakami | 198/623 |
| 8,210,529 | B2 | * | 7/2012 | Trudeau et al. | 271/273 |

FOREIGN PATENT DOCUMENTS

| DE | 4117997 A1 | 12/1992 |
|---|---|---|
| EP | 0897789 A1 | 2/1999 |

(Continued)

OTHER PUBLICATIONS

European Search Report, European Patent Application No. 11002798.4, mailed Aug. 3, 2011.

*Primary Examiner* — Douglas Hess
(74) *Attorney, Agent, or Firm* — Kilpatrick Townsend & Stockton LLP (57) ABSTRACT

A take-up machine is provided. Each of upper and lower conveying devices has an endless rotating body and a plurality of take-up pads provided on the surface of the endless rotating body. The take-up machine is configured to pinch a top face and a bottom face of a resin-molded article with the take-up pads of the upper and lower conveying devices to take up the resin-molded article. The take-up machine is installed along an extrusion line of a resin extruder. In a lateral direction orthogonal to an extrusion line, a length of each of the take-up pads is multiple times a length of the resin-molded article to be taken up. Each of the take-up pads has a plurality of supporting potions which are arranged in the lateral direction and capable of supporting resin-molded articles with different shapes. The upper and lower conveying devices are movable in the lateral direction so as to make one of the supporting portions coincide with the extrusion line.

4 Claims, 8 Drawing Sheets

LATERAL DIRECTION

FOREIGN PATENT DOCUMENTS

| | | |
|---|---|---|
| JP | 54038364 A | 3/1979 |
| JP | 2007-007909 A | 1/2007 |
| WO | 96/29186 A2 | 9/1996 |
| WO | 2004/037516 A2 | 5/2004 |

* cited by examiner

LATERAL DIRECTION

TAKE-UP MACHINE

The disclosure of Japanese Patent Application No. 2010-088406 filed on Apr. 7, 2010, including a specification, drawings and claims is incorporated herein by reference in its entirety.

BACKGROUND

The present invention relates to a take-up machine which is provided on a resin extrusion production line, and takes up a resin-molded article which is cooled and sized after being extrusion-molded.

There is a resin extrusion production line in which a resin extruder, a sizing device, a take-up machine, and a cutting machine are sequentially installed along an extrusion line. A resin-molded article is continuously extruded by the resin extruder, the resin-molded article is sized by the sizing device while being cooled, which results in a normal-temperature resin-molded article, and the resin-molded article is taken up by the take-up machine, and cut into a predetermined length by the cutting machine.

As the take-up machine provided on the resin extrusion production line as mentioned above, Patent Document 1 discloses a take-up machine in which upper and lower conveying devices each of which has an endless rotating body and take-up pads provided on the surface of the endless rotating body. The top and bottom faces of a resin-molded article to be conveyed are pinched and taken up by the take-up pads of the upper and lower conveying devices. The take-up pads are replaceable.

Patent Document 1: JP-A-2007-007909

In the aforementioned take-up machine, resin-molded articles with different shapes can be taken up by replacing take-up pads.

In order to increase the take-up force (conveying force) for a resin-molded article of this type of take-up machine, the resin-molded article may be pinched with a strong force by the upper and lower conveying devices. However, if doing so, there is a concern that the resin-molded article may be deformed. Therefore, the take-up force is increased by increasing the length of the upper and lower conveying devices in the conveying direction to increase the contact area with the resin-molded article.

For this reason, the upper and lower conveying devices have a number of take-up pads. Thus, it takes a long time to replace this number of take-up pads, and the setup time required for switching the take-up machine into a state where resin-molded articles with different shapes can be taken up becomes long.

As the setup time becomes long, the downtime of the resin extrusion production line also becomes long, and extrusion production efficiency deteriorates.

SUMMARY

It is therefore an object of at least one embodiment of the present invention to provide a take-up machine configured to be capable of performing setup in a short time.

In order to achieve the above-described object, according to an aspect of the embodiments of the present invention, there is provided a take-up machine, comprising upper and lower conveying devices 5 and 5, each having an endless rotating body 5a and a plurality of take-up pads 5b provided on the surface of the endless rotating body 5a, the take-up machine configured to pinch a top face 6a and a bottom face 6b of a resin-molded article 6 with the take-up pads 6b of the upper and lower conveying devices 5 and 5 to take up the resin-molded article 6, wherein the take-up machine is installed along an extrusion line of a resin extruder, wherein a length of each of the take-up pads 5b is multiple times a length of the resin-molded article 6 to be taken up in a lateral direction orthogonal to the extrusion line, and each of the take-up pads 5b has a plurality of supporting potions 7 which are arranged in the lateral direction and capable of supporting resin-molded articles 6 with different shapes, and wherein the upper and lower conveying devices 5 and 5 are movable in the lateral direction so as to make one of the supporting portions 7 coincide with the extrusion line.

In the take-up machine according to the aspect of the embodiments of the present invention, it is possible to laterally move the upper and lower conveying devices 5 and 5 to change the supporting portion 7 to coincide with the extrusion line, thereby performing the setup to a state where a resin-molded article with a different shape can be taken up in a short time.

In the take-up machine, each of the take-up pads 5b may have a plurality of recessed portions and flat faces which are alternately arranged in the lateral direction, one of the supporting portions 7 may be comprised of a combination of the recessed portions and the flat faces, and another one of the supporting portions 7 may be comprised of only the flat faces.

With such a configuration, a resin section having projecting portions, such as attachment fins, reinforcing protrusions, and glass-supporting protrusions, can be taken up, and resin-molded articles with different cross-sectional shapes can be taken up.

The take-up machine may further comprise a machine body 1. In the take-up machine, the lower conveying device 5 may be attached to a portion of the machine body 1, which is laterally movable such that the lower conveying device 5 is not vertically movable relative to the portion of the machine body 1, the upper conveying device 5 may be attached to the portion of the machine body 1, which is laterally movable such that the upper conveying device 5 is vertically movable relative to the portion of the machine body 1 and a downward force acts on the upper conveying device 5, and the take-up pads 5b of the upper conveying device 5 may be configured to push the resin-molded article 6 against the take-up pads 5b of the lower conveying device 5.

With such a configuration, the resin-molded article 6 can be pinched and taken up with the upper and lower take-up pads 5b. Moreover, the resin-molded article 6 can be horizontally taken up without being vertically moved on the basis of the take-up pads 5b of the lower conveying device 5.

In the take-up machine, the portion of the machine body 1, to which the lower conveying device 5 is attached is vertically movable so as to adjust a height of each of the take-up pads 5b of the lower conveying device 5.

With such a configuration, the height of each of the take-up pads 5b of the lower conveying device 5 can be adjusted according to the height of the resin-molded article 6 to be taken up so that the vertical center of the resin-molded article 6 which is being taken up can be matched to the vertical center of the extrusion line. Accordingly, resin-molded articles 6 with different heights can be horizontally taken up.

In the take-up machine, the machine body 1 may be comprised of a base 2, a laterally movable body 3 which is attached to the base 2 so as to be laterally movable, and an elevating body 4 which is attached to the laterally movable body 3 so as to be vertically movable, and the elevating body 4 may be provided with the upper and lower conveying devices 5 and 5.

With such a configuration, the upper and lower conveying devices 5 and 5 can be laterally moved together with the elevating body 4 by laterally moving the laterally movable body 3, and the height of each of the take-up pads 5b of the lower conveying device 5 can be adjusted by vertically moving the elevating body 4.

DETAILED DESCRIPTION OF THE EMBODIMENTS

Figure 1:
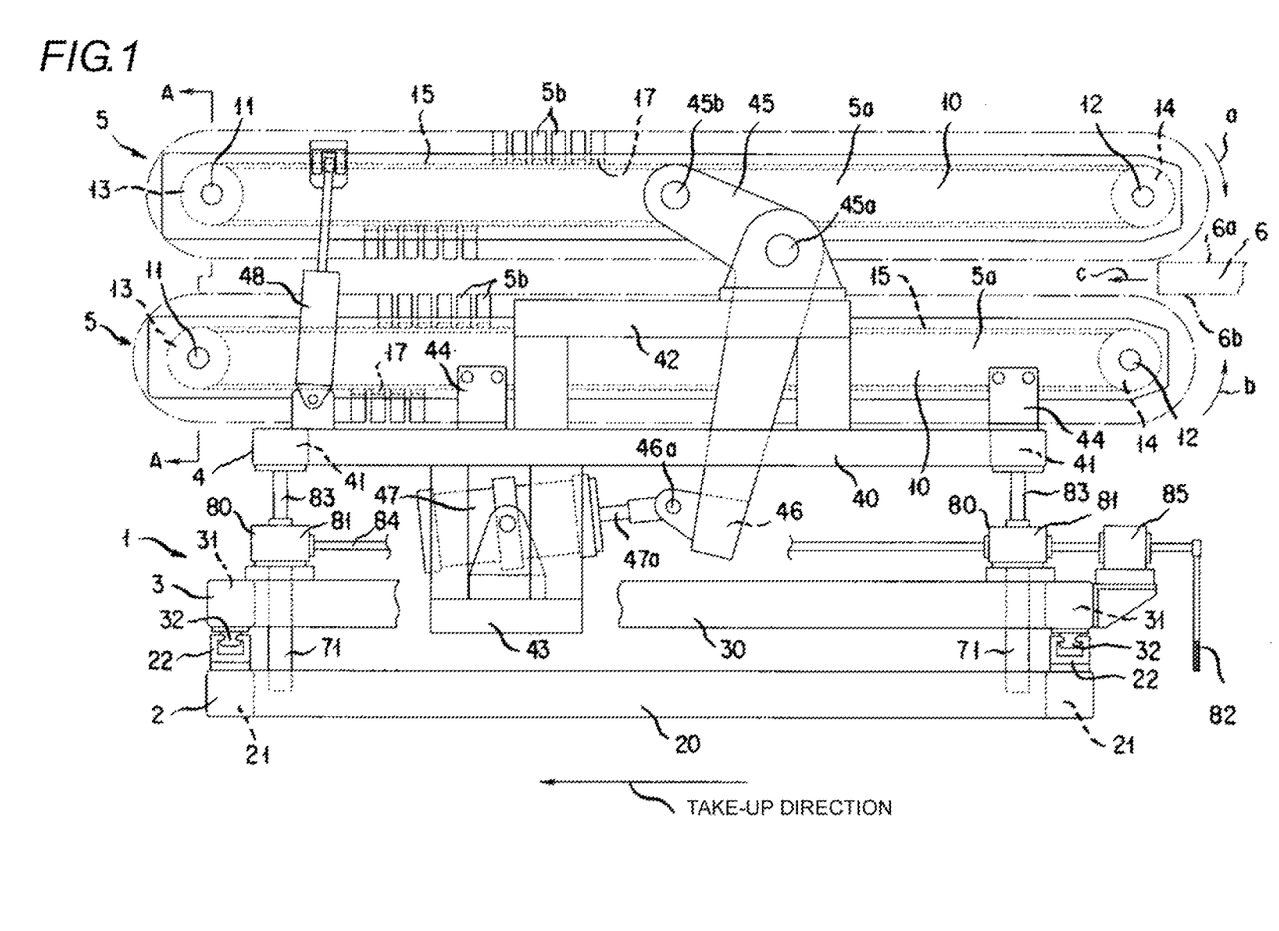
FIG. 1 is a front view of a take-up machine according to an embodiment of the present invention.

The overall configuration of a take-up machine of the invention will be described with reference to FIGS. 1 to 3.

A machine body 1 includes a base 2, a laterally movable body 3 which is provided at the base 2 so as to be laterally movable, and an elevating body 4 which is provided at the laterally movable body 3 so as to be vertically movable.

A pair of upper and lower conveying devices 5 and 5 is provided at the machine body 1, for example, the elevating body 4 so as to constitute the take-up machine.

Each conveying device 5 has an endless rotating body 5a and a plurality of take-up pads 5b provided on the surface of the endless rotating body 5a. A resin-molded article 6 is taken up in the direction of an arrow c by rotating upper and lower rotating bodies 5a and 5a in the directions of arrows a and b and pinching a top face 6a and a bottom face 6b of a resin-molded article 6 with the take-up pad 5b of the upper conveying device 5 and the take-up pad 5b of the lower conveying device 5.

In the following description, a direction in which resin is extruded from an extruder (not shown) is defined as an extrusion direction, and the extrusion direction is a take-up direction (arrow c) of the resin-molded article 6 using the upper and lower endless rotating bodies 5a and 5a.

The lateral direction is a direction orthogonal to the extrusion line (take-up direction) on a horizontal plane. A direction orthogonal to the horizontal plane is defined as the vertical direction.

Each of the take-up pads 5b has a rod shape with a predetermined width and thickness and is laterally long. The take-up pads 5b are attached to the surface of the endless rotating body 5a at intervals in the rotating direction with their longitudinal direction being turned to the aforementioned lateral direction.

Figure 2:
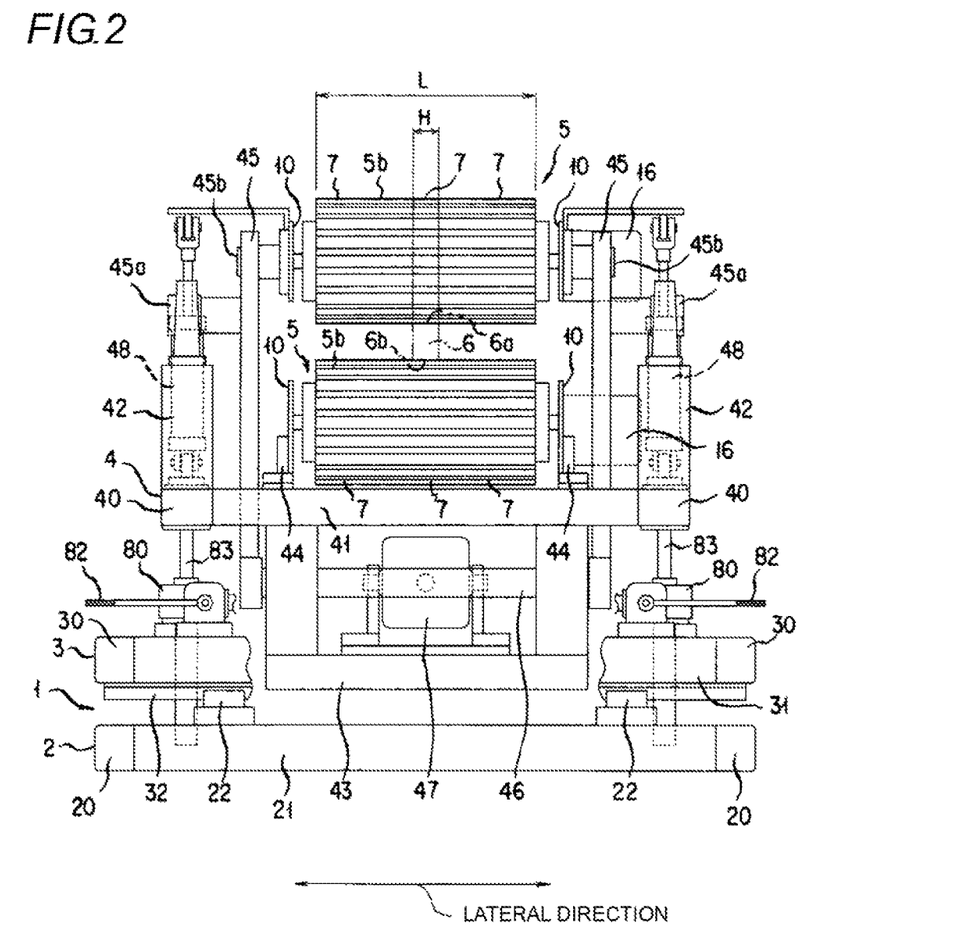
FIG. 2 is a right side view of the take-up machine according to the embodiment.
Figure 3:
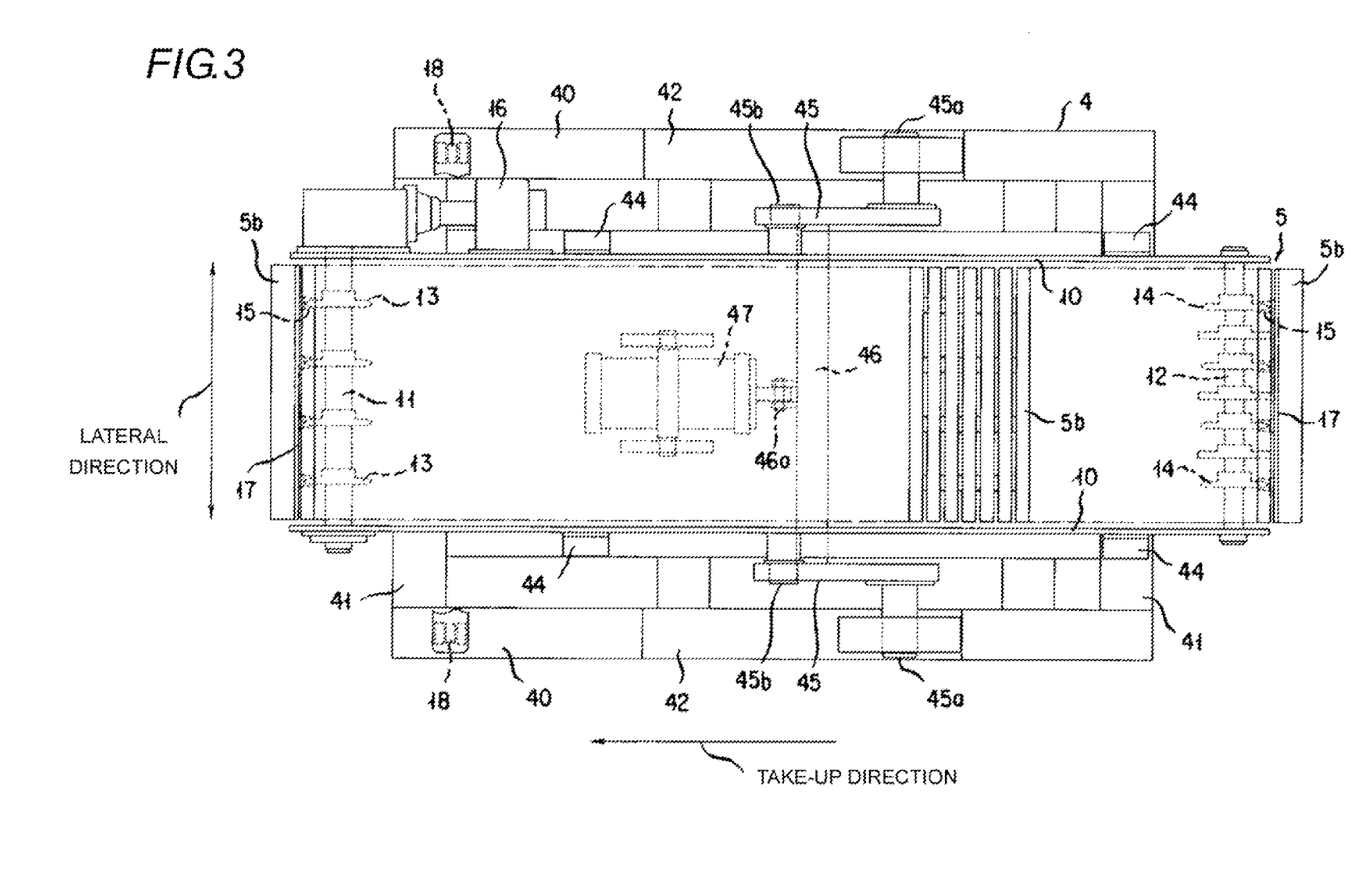
FIG. 3 is a plan view of the take-up machine according to the embodiment.

As shown in FIG. 2, the total length L of the take-up pads 5b (a length of each of the take-up pads 5b in the lateral direction) is considerably longer the lateral width H of the resin-molded article 6 (a length of the resin-molded article 6 in the lateral direction). For example, the total length L is substantially equal to multiple times the lateral width H.

The multiple times means, for example, that resin-molded articles 6 of the lateral length H can be arranged in parallel, and if the multiple times are equal to or more than two times, it is possible to take-up resin-molded articles 6 with two kinds of different shapes.

The surface shape of each of the take-up pads 5b is not the same over the total longitudinal length thereof but has a plurality of portions with different shapes. That is, each of the take-up pads 5b has a plurality of supporting portions 7 arranged in the lateral direction and capable of supporting resin-molded articles 6 with different shapes. The supporting portions 7 are portions which pinch the resin-molded articles 6 in contact with the top face 6a and the bottom face 6b.

For this reason, by laterally moving the laterally movable body 3 to laterally move the upper and lower conveying devices 5 and 5, it is possible to make any one of the supporting portions 7 coincide with the extrusion line.

Accordingly, in a case where a resin-molded article with a different shape is newly taken up, the take-up machine can be set up by laterally moving the upper and lower conveying devices 5 and 5 as mentioned above and making one of the supporting portions 7 corresponding to the shape of the resin-molded article to be newly taken up coincide with the extrusion line. Therefore, the setup can be performed in a short time.

The extrusion line is obtained by expressing a line which extends in the extrusion direction on the same line as a resin-molded article to be extrusion mold. The extrusion line can be set to the center of gravity in a sectional shape of a resin-molded article.

Figure 4:
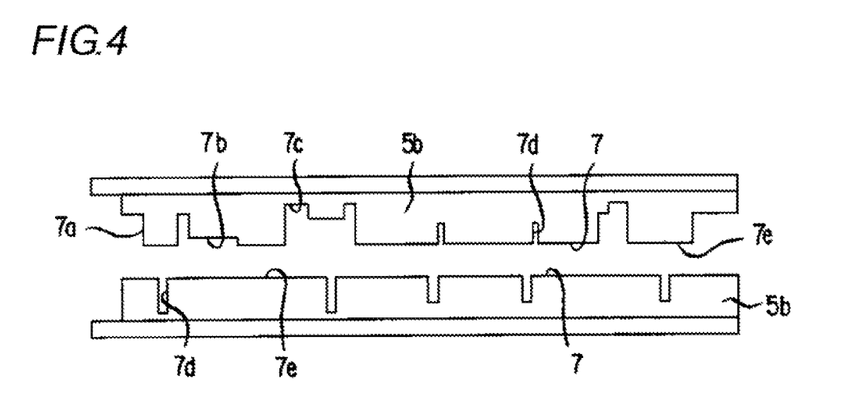
FIG. 4 is a cross-sectional view of take-up pads.

For example, as the surface shape of the take-up pads 5b, as shown in FIG. 4, the surface shape of the upper take-up pad 5b has a cutout portion 7a, a first stair-shaped concave portion 7b with different depth and width, a second concave portion 7c with a large width, and a slit groove 7d narrower than the second concave portion 7c, which are arranged at intervals in the longitudinal direction (in the lateral direction), and flat faces 7e are formed between the above portions 7a to 7d. One of the supporting portions 7 can be comprised of a combination of a plurality of the portions 7a to 7e adjacent to each other. Another one of the supporting portions 7 which has a shape different from the one of the supporting portions 7 can be comprised of only the flat faces 7e.

Since the cutout portion 7a, the first and second concave portions 7b and 7c, and the slit groove 7d are dented with respect to the flat face, these become recessed portions.

The surface shape of the lower take-up pad 5b has a plurality of slit grooves 7d at intervals in the longitudinal direction, and flat faces 7e are formed between the adjacent slit grooves 7d. The supporting portions 7d with different shapes can be formed by combining together the slit grooves 7d and the flat faces 7e or by only the flat faces 7e.

Figure 5A:
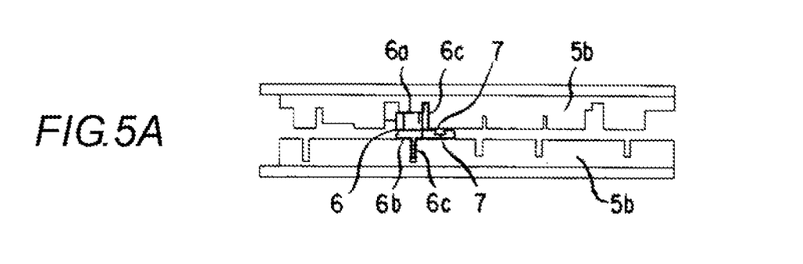
FIGS. 5A to 5E are explanatory views of a take-up operation of resin sections with different shapes.
Figure 5B:
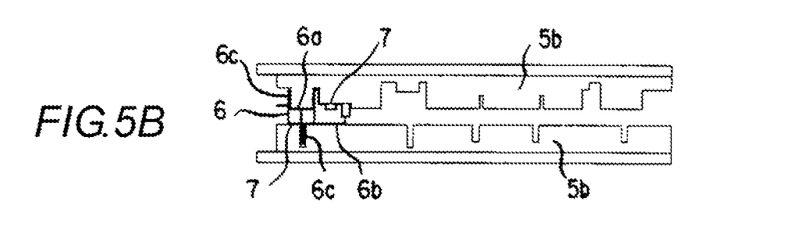
Figure 5C:
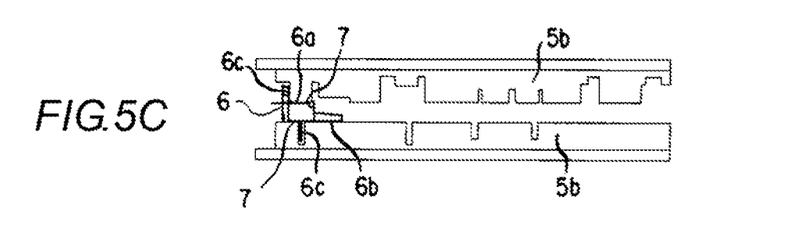
Figure 5D:
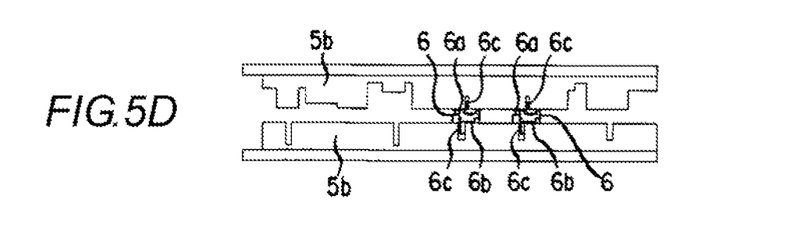
Figure 5E:
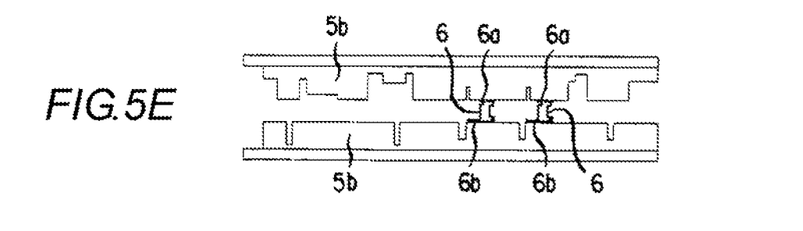

By doing so, as shown in FIGS. 5A, 5B, and 5C, resin-molded articles 6 with different shapes having projecting portions 6c on the top face 6a and the bottom face 6b; as shown FIG. 5D, two small resin-molded articles having projecting portions 6c on the top face 6a and the bottom face 6b; and as shown in FIG. 5E, two resin-molded articles 6 whose top face 6a and bottom face 6b are flat surfaces can be pinched and taken up.

Specifically, as the supporting portions 7, a plurality of supporting portions 7 capable of pinching the resin-molded articles 6 with different shapes in surface contact with the top face 6a and the bottom face 6b are provided depending on the longitudinal shape of the take-up pads 5b. As shown in FIGS. 5A, 5B, and 5C, FIG. 5A shows that a resin-molded article 6 is supported by the second concave portion 7c and lateral flat face 7e of the upper take-up pad 5b and the slit groove 7d and both lateral flat faces 7e of the lower take-up pad 5b, and this portion is a supporting portion 7. Although FIGS. 5A and 5B show almost the same positions in the lateral direction of the take-up pads 5b, FIG. 5B shows that the resin-molded article 6 is supported even in the first recessed portion 7b, and the supporting portions 7 are different from each other. Although FIGS. 5D and 5E are the same as FIGS. 5A, 5B, and 5C in that the supporting portions 7a are provided by the slit groove 7d and the flat face 7e similarly to the above, these are different from each other in that the take-up in a case where two resin-molded articles 6 are simultaneously extrusion-molded is performed. Although FIGS. 5D and 5E show resin-molded articles 6 with the same sectional shape, the shape may be different. In that case, it is necessary to change the shape of the take-up pads 5b in accordance with the shape of the articles.

That is, the aforementioned cutout portion 7a, first and second concave portions 7b and 7c, and slit groove 7d are recessed portions into which the projecting portions of the resin-molded article 6 escape.

The projecting portions are portions which have a vertical dimension greater than the dimension thereof in the width direction, for example, in the sectional shape of the resin-molded article 6, and protrude more than the faces of the supporting portions 7 which are supported by the flat faces 74.

The projecting portions which have entered the recessed portions with the resin-molded article 6 being supported by the supporting portions 7 have the space (gap) so as not to be vertically brought into contact with each other by the take-up pads 5b.

In short, since a resin section which constitutes a resin sash has projecting portions, such as attachment fins, reinforcing protrusions, and glass-supporting protrusions, the resin section has various cross-sectional shapes which either have or do not have projecting portions on the top and bottom faces thereof. Therefore, when the projecting portions are pinched, contact area may be small, a large take-up force may not be obtained, and the projecting portions may be deformed.

Thus, the take-tip pads 5b with a plurality of shapes having the recessed portions for the escape of the projecting portions and the flat faces as mentioned above are provided, and the projecting portions on the top and bottom faces of a resin section are pinched by the flat faces without being pinched. Thereby, resin sections having the projecting portions on the top and bottom faces thereof and having different shapes can be taken up, and two resin sections whose top and bottom faces are flat can be taken up.

The lower conveying device 5 is attached to a portion of the machine body 1, which is laterally movable such that the lower conveying device 5 is not vertically movable relative to the portion of the machine body 1. For example, the lower conveying device 5 is attached to the elevating body 4 of the machine body 1 so as not to move vertically relative to the elevating body 4.

The upper conveying device 5 is attached to the portion of the machine body 1, which is laterally movable such that the upper conveying device 5 is vertically movable relative to the portion of the machine body 1. For example, the upper conveying device 5 is provided at the elevating body 4 so as to be vertically movable relative to the elevating body 4. And a downward force acts on the upper conveying device 5.

For this reason, since the take-up pad 5b of the upper conveying device 5 is pushed against the top face 6a of the resin-molded article 6 and thereby, the bottom face 6b of the resin-molded article 6 is pushed against the take-up pad 5b of the lower conveying device 5, the resin-molded article 6 can be pinched and taken up using the upper and lower take-up pads 5b.

Moreover, since the lower conveying device 5 is attached to the elevating body 4 so as not to move vertically relative to the elevating body 4, the lower conveying device 5 is not moved vertically by the self-weight of the resin-molded article 6 and the pushing force, and the resin-molded article 6 can be horizontally taken up without being vertically moved on the basis of the take-up pad 5b of the lower conveying device 5.

Since the upper and lower conveying devices 5 and 5 move vertically along with the elevating body 4, the height of the lower conveying device 5 which becomes the basis for take-up can be adjusted, and when resin-molded articles 6 with different vertical dimensions are taken up, the vertical center (vertical center between the upper take-up pad 5b and the take-up pad 5b) of the resin-molded article 6 which is being taken up can be matched to the vertical center of the extrusion line.

Accordingly, the resin-molded article 6 can be horizontally taken up continuously with a sizing device. That is, if the height of the lower conveying device 5 cannot be adjusted, when resin-molded articles with different heights are taken up, the vertical center of the resin-molded article 6 which is being taken up may vary vertically, and may deviate from the vertical center of the extrusion line.

Next, specific shapes of the respective parts will be described.

In the endless rotating body 5a of the conveying device 5, a driving shaft 11 and a vertical shaft 12 are laterally bridged and rotatably attached between both lengthwise ends of a pair of lateral frames 10 and 10 which is long in the take-up direction.

Figure 6:
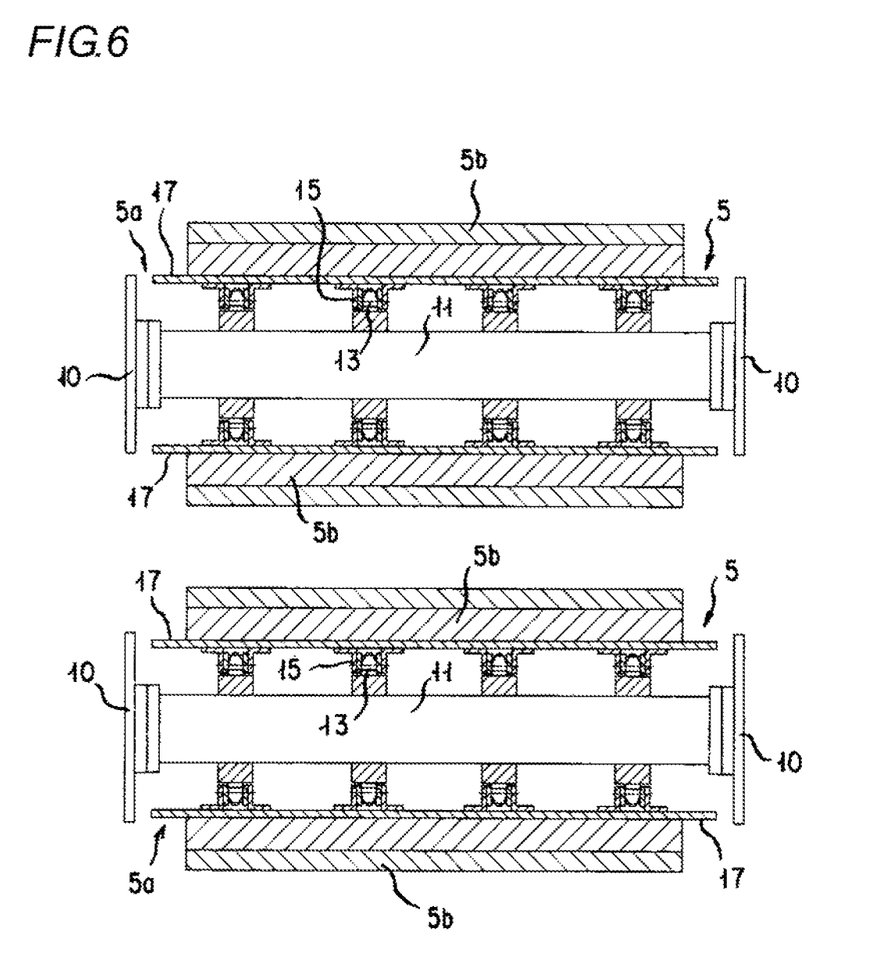
FIG. 6 is a cross-sectional view taken along a line A-A of FIG. 1.

As shown in FIG. 6, a plurality of driving sprockets is attached to the driving shaft 11, a plurality of driven sprockets is attached to the vertical shaft 12, an endless chain 15 is wound around each of the driving sprockets 13 and each of the driven sprockets 14, each endless chain 15 is rotated by rotating the driving shaft 11 using a driving motor 16, and a number of narrow plates 17 are attached at intervals in the rotational direction over each endless chain 15.

The take-up pads 5b are attached to the plates 17, respectively.

The elevating body 4 has a flame shape including a plurality of first horizontal members 40 which are directed to the take-up direction and a plurality of second horizontal members 41 which are directed to the lateral direction. A pair of supporting frames 42 is erected from both lateral shaft portions of the elevating body, and an attachment frame 43 hangs from a lateral intermediate portion.

The upper and lower conveying devices 5 are disposed between the pair of supporting frames 42. Frames 10 of the lower conveying device 5 are secured to the first horizontal members 40 by brackets 44, and the lower conveying device 5 is attached to the elevating body 4 so as not to move.

Intermediate portions of rocking arms 45 are rockably attached to the pair of supporting frames 42 by first pivots 45a. Each rocking arm 42 has one end turnably connected to a longitudinal intermediate portion of each of the pair of frames 10 of the upper conveying device 5 by a second pivot 45b and the other end protruding downward more than the first and second horizontal members 41 and 42, and the rocking arms are connected to each other by a connecting member 46.

A rocking cylinder 47 is attached to the attachment frame 43. A piston rod 47a of the rocking cylinder 47 is connected to the connecting member 46 by a pin 46a.

The piston rod 47a of the rocking cylinder 47 is extended by pneumatic pressure, for example, air, whereby each rocking arm 45 rocks in one direction and one end thereof moves downward and applies a downward force to the upper conveying device 5.

Balancer cylinders 48 are attached over the first horizontal members 40 of the elevating body 4 and the frames 10 of the upper conveying device 5. The balancer cylinders 48 are closely attached to the longitudinal ends of the frames 10, and closely support the longitudinal ends of the upper conveying device 5 so as to be vertically movable, and the upper conveying device 5 is configured to be vertically movable in parallel by the rocking of the rocking arms 45.

In short, the upper conveying device 5 is vertically movable on the elevating body 4 by the rocking arms 45, the rocking cylinder 47, and the balancer cylinders 48, and is provided so as to apply a downward force.

As mentioned above, since the pair of rocking arms 45 and the pair of balancer cylinders 48 are disposed on both lateral sides of the upper and lower conveying devices 5 and 5, the upper and lower conveying devices 5 and 5 can be provided on the elevating body 4 in a well-balanced manner, and the rocking arms 45, the rocking cylinder 47, and the balancer cylinders 48 do not become an obstacle to the take-up of a resin-molded article.

The base 2 has a frame shape which has a plurality of first horizontal members 20 which is directed to the take-up direction and a plurality of second horizontal members 21 which is directed to the lateral direction, and the laterally movable body 3 has also a frame shape which has first horizontal members 30 and second horizontal members 31 similarly to the base 2.

Sliders 22 are attached to the top faces of the second horizontal members 21 toward the lateral direction.

Guide rails 32 are attached to the bottom faces of the second horizontal members 31 of the laterally movable body 3 toward the lateral direction.

The guide rails 32 are slidably supported on the sliders 22, and are used as laterally movable guides of the laterally movable body 3.

Figure 7:
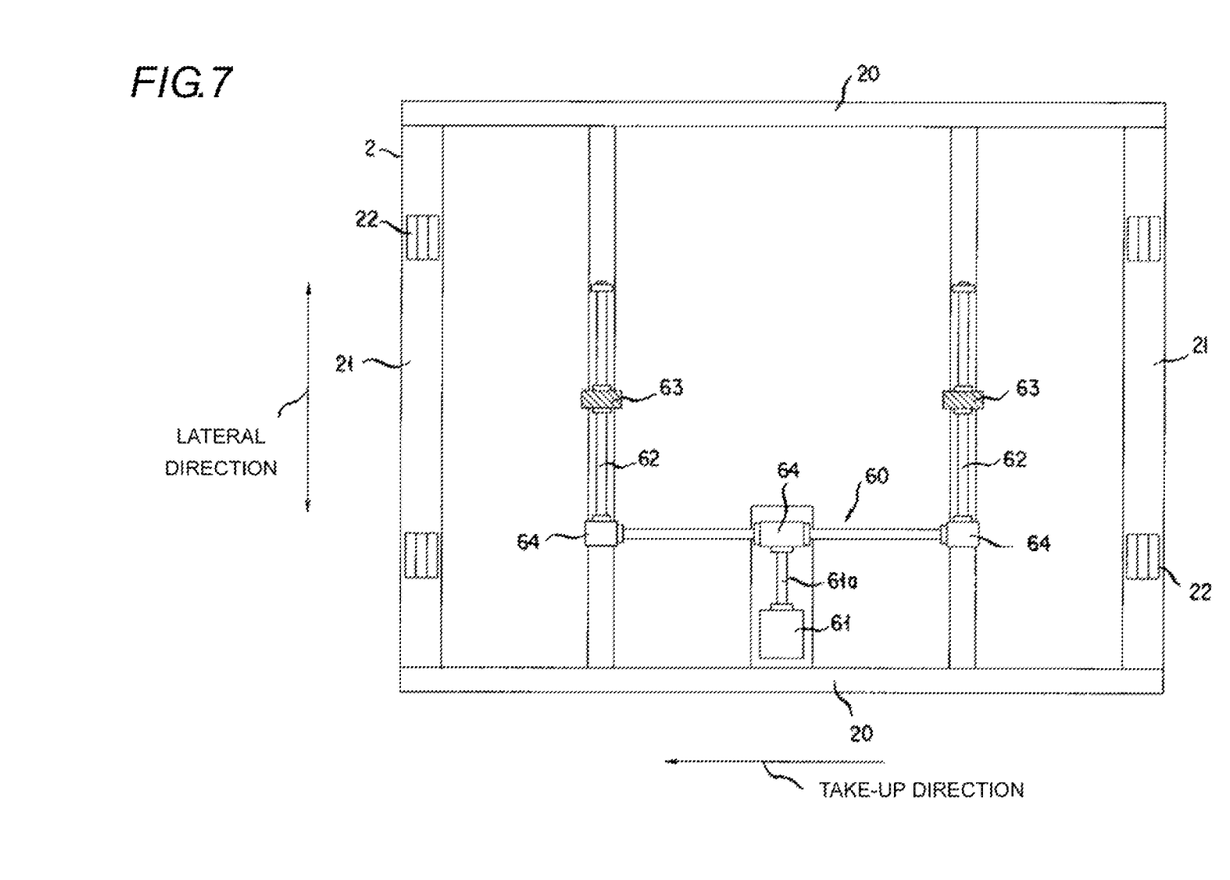
FIG. 7 is a plan view of a lateral movement device.

The laterally movable body 3 is laterally moved by a lateral movement device 60. As shown in FIG. 7, the lateral movement device 60 includes feed screws 62 rotated by a motor 61 attached to the base 2, and nut members 63 to which the feed screws 62 are screwed, and the nut members 63 are secured to the laterally movable body 3.

When the feed screws 62 are rotated by moving the motor 61, the laterally movable body 3 moves laterally along with the nut members 63.

A plurality of feed screws 62 is attached at intervals in the take-up direction, for example, a pair of feed screws 62 is rotatably attached toward the lateral direction.

The pair of feed screws 62 is connected to an output shaft 61a of the motor 61 via rotation transmission portions 64, and the pair of feed screws 62 is rotated as the output shaft 61a of the motor 61 rotates.

The feed screws 62 may be rotated by a handle without using the motor 61.

The elevating body 4 is supported on guide devices 70 so as to be vertically movable to the laterally movable body 3, and is vertically moved by elevating devices 80.

Figure 8:
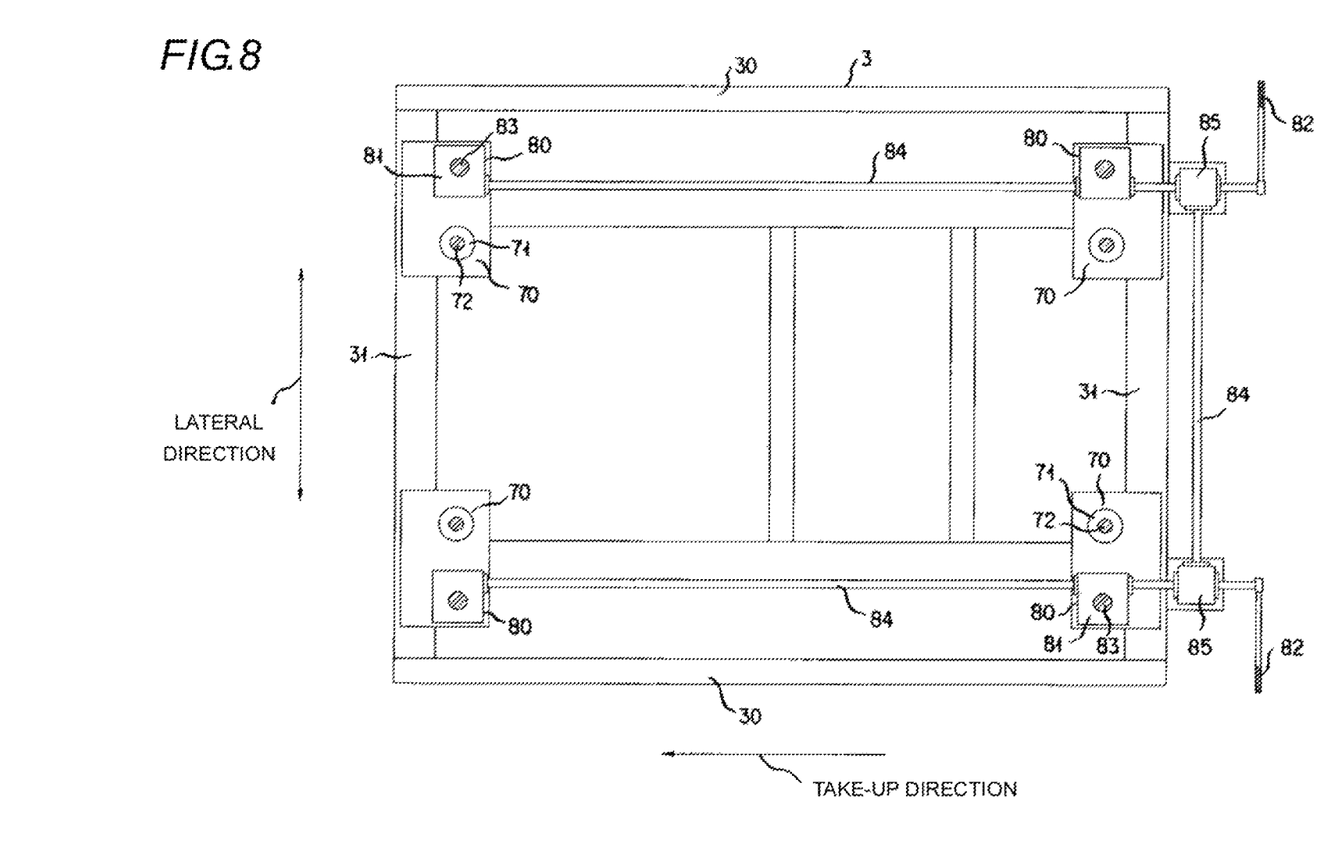
FIG. 8 is a plan view of a guide device and an elevating device.

Each guide device 70 is obtained by slidably fitting a guide rod 72 into a guide barrel 71 attached to the laterally movable body 3. As shown in FIG. 8, the guide devices are provided at four corner portions of the laterally movable body 3 and the elevating body 4.

Each elevating device 80 includes a jack 81 attached to the laterally movable body 3, and a handle 82. In the jack 81, as a nut (not shown) rotates, a vertical screw 83 moves vertically. The vertical screw 83 is connected to the elevating body 4, and as the handle 82 is operated, the vertical screw 83 moves vertically and the elevating body 4 moves vertically.

As shown in FIG. 8, jacks 81 are attached to four corner portions, respectively, of the elevating body 4, and the jacks 81 interlock with each other by a rotating shaft 84 and a rotation transmission portion 85.

Two handles 82 are laterally provided.

In addition, a motor may be provided instead of the handles 82, and the vertical screws 83 may be vertically moved by driving the motor.

What is claimed is:

1. A take-up machine, comprising upper and lower conveying devices, each having an endless rotating body and a plurality of take-up pads provided on the surface of the endless rotating body, the take-up machine configured to pinch a top face and a bottom face of a resin-molded article with the take-up pads of the upper and lower conveying devices to take up the resin-molded article,
   wherein the take-up machine is installed along an extrusion line of a resin extruder,
   wherein a length of each of the take-up pads is multiple times a length of the resin-molded article to be taken up in a lateral direction orthogonal to the extrusion line, and each of the take-up pads has a plurality of supporting portions which are arranged in the lateral direction and capable of supporting resin-molded articles with different shapes,
   wherein each of the take-up pads has a plurality of recessed portions and flat faces which are alternately arranged in the lateral direction, wherein one of the supporting portions is comprised of a combination of the recessed portions and the flat faces, and wherein another one of the supporting portions is comprised of only the flat faces, and
   wherein the upper and lower conveying devices are movable in the lateral direction so as to make one of the supporting portions coincide with the extrusion line.

2. The take-up machine as set forth in claim 1, further comprising a machine body,
   wherein the lower conveying device is attached to a portion of the machine body, which is laterally movable such that the lower conveying device is not vertically movable relative to the portion of the machine body,
   wherein the upper conveying device is attached to the portion of the machine body, which is laterally movable such that the upper conveying device is vertically movable relative to the portion of the machine body and a downward force acts on the upper conveying device, and
   wherein the take-up pads of the upper conveying device are configured to push the resin-molded article against the take-up pads of the lower conveying device.

3. The take-up machine as set forth in claim 2, wherein the portion of the machine body, to which the lower conveying device is attached is vertically movable so as to adjust a height of each of the take-up pads of the lower conveying device.

4. The take-up machine as set forth in claim 3,
   wherein the machine body is comprised of a base, a laterally movable body which is attached to the base so as to be laterally movable, and an elevating body which is attached to the laterally movable body so as to be vertically movable, and
   wherein the elevating body is provided with the upper and lower conveying devices.

* * * * *

UNITED STATES PATENT AND TRADEMARK OFFICE
CERTIFICATE OF CORRECTION

PATENT NO. : 8,443,965 B2
APPLICATION NO. : 13/078033
DATED : May 21, 2013
INVENTOR(S) : Koji Matsuda Page 1 of 1

It is certified that error appears in the above-identified patent and that said Letters Patent is hereby corrected as shown below:

On title page, item (57), under "ABSTRACT", in column 2, line 12, Delete "potions" and insert -- portions --, therefor.

In the Specifications

In column 2, line 7, Delete "potions" and insert -- portions --, therefor.

In column 5, line 41, Delete "take-tip" and insert -- take-up --, therefor.

Signed and Sealed this
Seventh Day of January, 2014

Margaret A. Focarino
*Commissioner for Patents of the United States Patent and Trademark Office*